(12) United States Patent
De Jong (10) Patent No.: US 10,625,961 B2
(45) Date of Patent: Apr. 21, 2020

(54) BLOCKING DEVICE AND METHOD FOR BLOCKING A VEHICLE AND/OR ENTRANCE TO A LOADING-UNLOADING STATION, AND A DOCK AND DISTRIBUTION CENTER PROVIDED THEREWITH

(71) Applicant: Stertil B.V., Kootstertille (NL)

(72) Inventor: Jurjen Jan De Jong, Buitenpost (NL)

(73) Assignee: Stertil B.V., Kootstertille (NL)

( * ) Notice: Subject to any disclaimer, the term of this patent is extended or adjusted under 35 U.S.C. 154(b) by 0 days.

(21) Appl. No.: 16/061,782

(22) PCT Filed: Oct. 28, 2016

(86) PCT No.: PCT/NL2016/050752
§ 371 (c)(1),
(2) Date: Jun. 13, 2018

(87) PCT Pub. No.: WO2017/105219
PCT Pub. Date: Jun. 22, 2017

(65) Prior Publication Data
US 2018/0362273 A1     Dec. 20, 2018

(30) Foreign Application Priority Data
Dec. 16, 2015 (NL) ...................... 2015971

(51) Int. Cl.
*B65G 69/00*     (2006.01)
(52) U.S. Cl.
CPC .................. *B65G 69/005* (2013.01)

(58) Field of Classification Search
CPC .................................................. B65G 69/005
See application file for complete search history.

(56) References Cited

U.S. PATENT DOCUMENTS

| 5,896,957 A | 4/1999 | Berends et al. |
| 6,371,253 B1 | 4/2002 | Berends et al. |
| 6,773,221 B2 * | 8/2004 | Belongia ............ B65G 69/005 414/396 |

(Continued)

FOREIGN PATENT DOCUMENTS

| CA | 2723636 C | * 4/2014 | ............... B60T 3/00 |
| EP | 0684915 B1 | 8/2001 | |

(Continued)

*Primary Examiner* — Kaitlin S Joerger
(74) *Attorney, Agent, or Firm* — The Webb Law Firm (57) ABSTRACT

The present invention relates to a blocking device for blocking a vehicle and/or entrance to a loading-unloading station, a dock and/or distribution center provided therewith and method therefor. The blocking device includes: a guide track with guide track supports disposed along a driveway; a carriage attached to the guide track with a blocking element, with the carriage being capable of moving along the driveway; a blocking element extension mechanism configured to extend the blocking element between a retracted position and an extended blocking position; and a guide track drive configured for lifting and/or lowering the guide track. The guide track drive is further configured such that the guide track performs a horizontal movement when being lifted or lowered, and the vertical and horizontal movements are being performed simultaneously or successively.

20 Claims, 4 Drawing Sheets (56) References Cited

U.S. PATENT DOCUMENTS

| | | | | |
|---|---|---|---|---|
| 7,537,095 B2 * | 5/2009 | Eriksson | ................... | B60T 3/00 |
| | | | | 188/32 |
| 8,464,846 B2 * | 6/2013 | Andersen | ............ | B65G 69/005 |
| | | | | 188/32 |
| 8,465,245 B2 * | 6/2013 | Manone | ............... | B65G 69/005 |
| | | | | 188/32 |
| 8,857,574 B2 * | 10/2014 | De Jong | ............. | B65G 69/005 |
| | | | | 188/32 |
| 8,869,948 B2 * | 10/2014 | Saliger | ................. | B65G 69/005 |
| | | | | 188/32 |
| 9,010,501 B2 * | 4/2015 | Brooks | ................ | B65G 69/005 |
| | | | | 188/32 |
| 9,162,831 B2 * | 10/2015 | De Jong | ............. | B65G 69/005 |
| 10,227,189 B2 * | 3/2019 | De Jong | ............. | B65G 69/005 |
| 2009/0223764 A1 | 9/2009 | Andersen et al. | | |
| 2011/0233006 A1 | 9/2011 | De Jong | | |
| 2012/0282069 A1 | 11/2012 | Ballester | | |
| 2013/0341130 A1 | 12/2013 | De Jong | | |

FOREIGN PATENT DOCUMENTS

| | | | | |
|---|---|---|---|---|
| EP | 2371745 A1 | | 10/2011 | |
| EP | 2796395 A1 * | | 10/2014 | ................ B60T 3/00 |
| GB | 2528380 A * | | 1/2016 | ........... B65G 69/005 |
| WO | WO-2017105219 A1 * | | 6/2017 | ........... B65G 69/005 |

* cited by examiner

BLOCKING DEVICE AND METHOD FOR BLOCKING A VEHICLE AND/OR ENTRANCE TO A LOADING-UNLOADING STATION, AND A DOCK AND DISTRIBUTION CENTER PROVIDED THEREWITH

CROSS-REFERENCE TO RELATED APPLICATIONS

This application is the United States national phase of International Application No. PCT/NL2016/050752 filed Oct. 28, 2016, and claims priority to Dutch Patent Application No. 2015971 filed Dec. 16, 2015, the disclosures of which are hereby incorporated in their entirety by reference.

BACKGROUND OF TITLE INVENTION

Field of the Invention

The present invention relates to a blocking device for blocking a vehicle such as a truck. Also, the blocking device relates to blocking an entrance to a loading-unloading station. Such devices are often used at distribution centers that receive and send loads, including packages, parcels, pallets with products, consumable materials and finished products. Distribution centers include at least one dock or docking station configured to receive a truck or trailer or a container or other swap body for loading and/or unloading. Often, such dock comprises so-called dock houses including dock levellers, dock shelters and components thereof.

Description of Related Art

Blocking devices are described in US 2013/0341130 A1, and EP 2 371 745 A1. Such blocking devices comprise a carriage that is moved over a guide track. As soon as a truck is correctly positioned relative to the loading-unloading station/dock, the carriage is moved to the desired position. Next, the blocking element is moved into position in order to hold the rear wheel of the truck and making driving or rolling away impossible. Some of the conventional blocking devices comprise height-adjusting means for height adjustment of the guide track and/or the blocking element during use. This provides flexibility to deal with all types of vehicles, for example.

The importance of blocking devices for safety concerns have increased. Transport takes place over larger distances involving international transport. This leads to increasing communication difficulties between truck drivers and personnel of a distribution center, for example. This increases safety risks. In addition, less space is available for a dock such that manoeuvring a truck or swap body is more difficult.

SUMMARY OF THE INVENTION

The present invention has for an object to obviate or at least reduce one or more of the above-stated problems with by improving conventional blocking devices.

The present invention provides for this purpose a blocking device for blocking a vehicle and/or entrance to a loading-unloading station, the blocking device comprising:
a guide track with guide track supports disposed along a driveway;
a carriage attached to the guide track with a blocking element, with the carriage being capable of moving along the driveway;
a blocking element extension mechanism configured to extend the blocking element between a retracted position and an extended blocking position; and
a guide track drive configured for lifting and/or lowering the guide track, wherein the guide track drive is further configured such that the guide track performs a horizontal movement when being lifted or lowered, and wherein the vertical and horizontal movements are being performed simultaneously or successively.

According to the invention the terminology of loading-unloading station, a dock, a dock house and a docking station are used interchangeably. A dock can be provided with a dock shelter and/or dock leveller.

The guide track of the blocking device according to the invention is disposed along a driveway of a loading-unloading station or for instance a distribution center. A container, swap body or truck can be parked in the driveway along the guide track for the purpose of loading and/or loading. Preferably, the blocking element is attached to the carriage that is moveably attached to the guide track and is capable of being positioned against one of the rear wheels or rear tyres of the vehicle to be blocked. When the blocking element, such as a rod, bar, pen etc. is in contact with the vehicle tyre, the blocking device blocks the vehicle. This provides an effective blocking of the vehicle presenting accidental and/or unauthorized movement of the vehicle. The blocking element is put in place with a blocking element extension mechanism that is capable of moving the blocking element between a retracted position and an extended blocking position.

The blocking element may also block access or entrance to the driveway and thereby preventing access to a container or swap body by an unauthorized vehicle. This prevents unauthorized picking up of the container or swap body, including unauthorized picking up of goods that are located outside the container or swap body, such as palletized goods. This reduces the risk of damage and/or theft of goods. By enabling the carriage to move along the guide track the position of the carriage and blocking element attached thereto can be chosen depending on the vehicle, swap body, container. This provides the blocking device with flexibility to deal with different types of vehicles and/or objects in the driveway.

When the blocking element is in a retracted position, a vehicle and/or object has access to the driveway and can be parked in the driveway or be removed therefrom. In case blocking is required, the blocking element is positioned correctly and moved into an extended blocking position. This prevents access to the driveway and prevents removing the vehicle. In the presently preferred embodiment the carriage is provided with a locking member that is capable of releasably locking the carriage relative to the guide track. This keeps the blocking element in its position.

In a presently preferred embodiment, the blocking element is rotated by the blocking element extension mechanism around a substantially vertical shaft when being moved between a retracted and an extended position or vice versa. It will be understood that other configurations for movement of the blocking element could also be envisaged in accordance with the invention. In the presently preferred embodiment the blocking element is moved into its position close to the ground of the driveway. Close to the ground sufficient space is available for the movement of the blocking element between the retracted and extended position without having the risk that during its movement the blocking element comes to inappropriate contact with the truck or object that is placed in the driveway. This prevents damage to the truck or object. Furthermore, the functioning of the blocking device is not damaged.

The blocking device according to the invention further comprises a guide track drive that is configured for lifting and/or lowering the guide track, wherein the guide track drive is further configured such that the guide track performs a horizontal movement when being lifted or lowered. As mentioned earlier, close to the ground more space is available for movement of the blocking element. After moving the blocking element into position the guide track can be lifted and an effective blocking is achieved. When removing the blocking element the guide track can be lowered, where after the blocking element is rotated to its retracted position. This provides an effective operation of blocking and unblocking a vehicle and/or entrance to a loading-unloading station. Furthermore, by providing an adaptable engaging height of the blocking element on the vehicle and/or other object in the driveway, the flexibility of the blocking device to deal with a variety of vehicles and/or objects is increased.

The horizontal and vertical movement of the guide track can be performed simultaneously. This provides an efficient diagonal movement. Alternatively, the horizontal and vertical movements are performed successively. Preferably, the horizontal movement is performed as a first step before lifting the guide track in a second step. When lowering the guide track, preferably the guide track is moved vertically in a first step and horizontally in a second step. The successive combination of the horizontal and vertical movements results in an effective diagonal movement of the guide track.

Optionally, the blocking device is provided with calculation means involving a processor and a controller to calculate the desired height of the blocking element when being in an extended position. This may involve using the blocking element for determining the vehicle tyre diameter. In such embodiment the blocking element is brought into contact with the vehicle tyre at two or more different heights such that the vehicle tyre diameter can be determined. Using this information the calculation means determine the associated desired height of the blocking element. This obviates the need for additional sensors, thereby reducing the risk of sensor fouling due to rain, snow, wind and/or an object hindering the measurement such as leaves. This contributes to a robust blocking device.

The guide track drive may comprise a number of hydraulic/pneumatic cylinders and/or an electronic control. In a presently preferred embodiment the individual guide track supports are provided with a hydraulic cylinder for lifting and lowering the guide track. It will be understood that also other control elements can be applied in accordance with the present invention, including pneumatic cylinders, electronic controllers etc.

The guide track drive of the blocking device according to the invention is further configured to enable the guide track to perform a horizontal movement when being lifted or lowered. Such horizontal movement moves the guide track away from or closer to the driveway and a vehicle or object parked in the driveway. In a presently preferred embodiment according of the invention the horizontal distance between the guide track and a vehicle or object parked in the driveway is increased when lifting the guide track. When the guide track is at a low vertical position, i.e. close to the ground, a truck or object can be placed in the driveway. For blocking purposes the guide track is lifted to its desired position. Preferably, the blocking element is already moved into its extended position capable of blocking the vehicle or object when lifting the guide track. This prevents damaging the truck or object. For example, this prevents damage to a rim or mudguard or other parts of a truck.

Preferably, the movements of the guide track in the vertical and horizontal directions are performed simultaneously, such that the direction of movement of the guide track is at an angle to the vertical. In a presently preferred embodiment the angle of movement is in the range of 5-30° with the vertical, preferably in the range of 10-20°, and most preferably in the range of 10-15°. This simultaneous movement in vertical and horizontal directions reduces the risk of undesired contact between the blocking device and the vehicle or object in the driveway such that the function of the blocking device remains in tact and/or damage is prevented.

In a preferred embodiment according to the present invention the guide track comprises an additional support extending over at least a part of the guide track in a lengthwise direction thereof.

By providing an additional support the stability of the guide track and the blocking device is improved. This obviates the need for over-dimensioning of the blocking device. Without an additional support the guide track must be capable of dealing with a moveable carriage and the associated forces at every position along the guide track. The additional support contributes to handling forces caused by the moveable carriage.

Preferably, the additional support is moveable along the guide track. By providing a moveable support additional robustness and stability to the blocking device is provided. The moveable support provides the desired strength and stability to deal with the forces associated with the moveable carriage at the actual location of the carriage along the guide track. Preferably, the additional support moves together with the carriage along the guide track. This can be achieved by providing a drive pin, catch pin or other connection.

In a presently preferred embodiment the carriage is moveable by a carriage drive, wherein the carriage drive comprises a spindle. In a presently preferred embodiment, the moveable additional support prevents sagging of the spindle, especially in view of the forces acting thereon in view of the moveable carriage. Also, the additional support prevents or at least reduces oscillation or swinging of the spindle.

In a presently preferred embodiment according to the invention the guide track supports are put at an angle to the lengthwise direction of the guide track.

Putting the guide track supports at an angle to the lengthwise direction of the guide track or driveway achieves an effective joint movement of the guide track when lifting the guide track in both a horizontal and vertical direction. Furthermore, by putting the guide track support at an angle to the guide track the required space is reduced. This enables providing adjacent driveways relatively close to each other, such that also adjacent docks can be placed relatively close to each other. This provides an effective dock and distribution center.

Preferably, the guide track comprises a support connection for hingedly connecting to one of the guide track supports. This enables moving the guide track and guide track supports relative to each other. In one of the presently preferred embodiment the support connection comprises a sliding connector that enables a sliding movement between the guide track support and the guide track. This prevents or reduces the movement of the guide track in a lengthwise direction due to a lifting movement. This sliding connector enables to substantially maintain the guide track in its position as seen in the lengthwise direction of the driveway irrespective of the actual height of the guide track.

In a further preferred embodiment according to the present invention the guide track drive of the blocking device comprises a first lifting mechanism for lifting the guide track.

By providing at least one lifting mechanism, preferably acting on a first end of the guide track, the guide track can be lifted effectively. Optionally, a further lifting support arm is provided at a second end such that a parallelogram configuration is achieved with the guide track, first lifting mechanism, lifting support arm and ground surface. In this embodiment the lifting support arm is driven by the first lifting mechanism.

In a presently preferred embodiment the first lifting mechanism lifts a first end of the guide track, and the guide track drive further comprises a second lifting mechanism for lifting a second end of the guide track, and a drive connection configured for connecting the first lifting mechanism with the second lifting mechanism.

By providing a first and a second lifting mechanism the guide track can be lifted as a modular unit, thereby substantially maintaining the guide track in a substantially horizontal orientation during lifting of lowering the guide track. Providing the lifting support arm as a second lifting mechanism a robust lifting operation can be achieved. By further providing a drive connection connecting the separate lifting mechanisms, the lifting operation of the two ends of the guide track can be performed jointly. Optionally, adjusting means are provided in the first and/or second lifting mechanisms to correct for height differences between the two ends of the guide track. These adjusting means may comprise a height sensor, a controller, adjusting valves or control elements.

Preferably, the lifting mechanisms are located in or at the guide track supports. This provides additional stability to the blocking device. Furthermore, this reduces the risk of damaging the lifting mechanisms.

In a further preferred embodiment according to the present invention the blocking device further comprises an anti-roll mode, wherein the blocking element engages a tire or other element at a first height, and a locking mode, wherein the blocking element engages the tire or other element at a second height that is higher as compared to the first height.

Providing a relatively low engaging height prevents the vehicle from rolling away during loading and/or unloading in an anti-roll mode. A relatively high engaging height prevents unauthorized driving away with a vehicle or object during parking of the vehicle or object in a blocking mode. This enhances the applicability and possible use of the blocking device according to the invention.

The present invention also relates to a dock of a loading-unloading station and/or a distribution center comprising one or more of these docks and/or blocking devices as described earlier.

Such dock and/or distribution center provide the same effects and advantages as described in respect of the blocking device.

In a further preferred embodiment according to the present invention, the dock comprises a second blocking device on the other side of the driveway. By providing a second blocking device an individual driveway is provided with separate blocking devices on the left hand side and right hand side of the driveway. This provides additional safety to vehicles and/or objects that are placed in the driveway.

The invention further also relates to a method for blocking a vehicle and/or guarding a driveway of a loading-unloading station, the method comprising the steps of:
providing a blocking device as described earlier; and
blocking and/or releasing a vehicle and/or entry to the driveway.

Such method likewise provides the same effects and advantages as described in respect of the blocking device, dock of a loading-unloading station, and/or distribution center.

BRIEF DESCRIPTION OF THE DRAWINGS

Further advantages, features and details of the invention are elucidated on the basis of preferred embodiments thereof, wherein reference is made to the accompanying drawings, in which.

DESCRIPTION OF THE INVENTION

Figure 1:
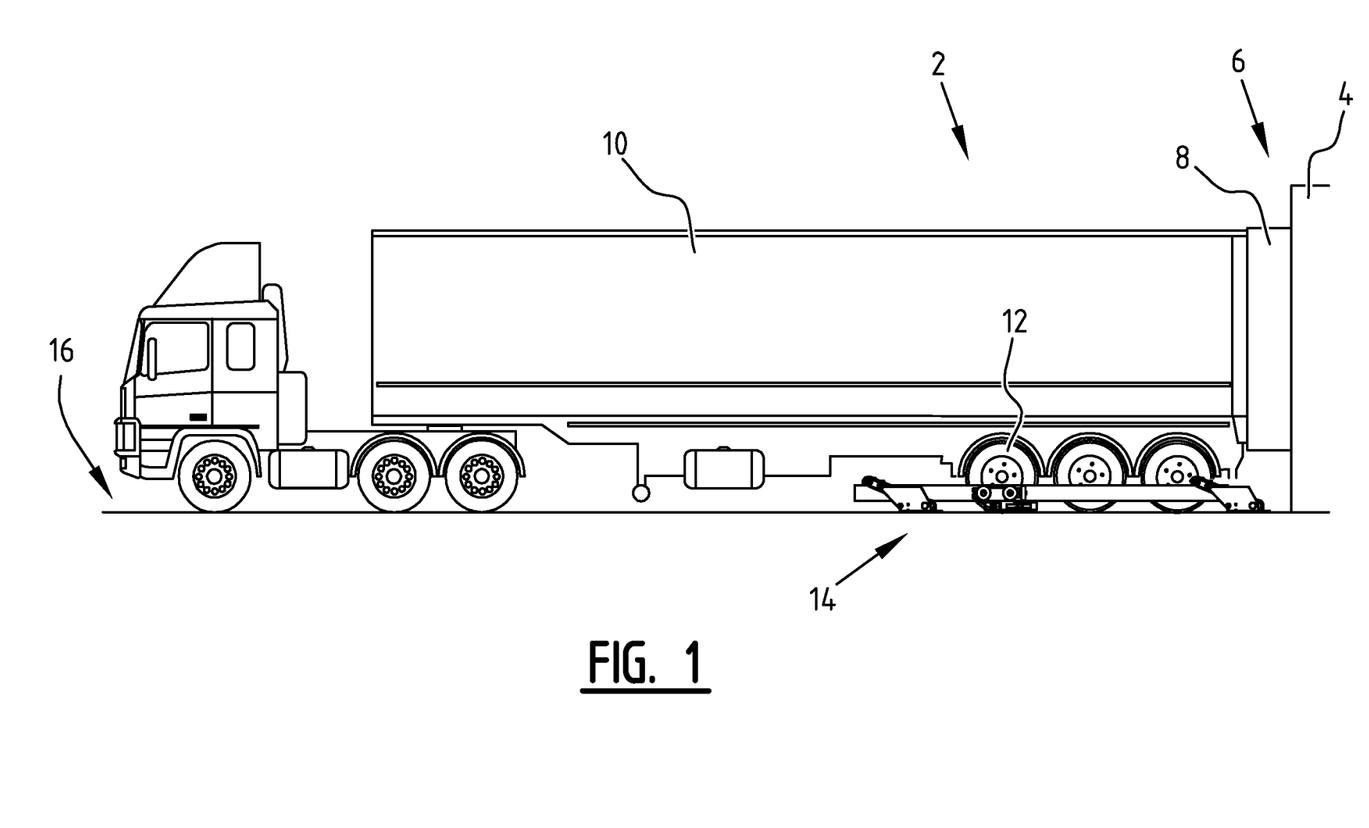
FIG. 1 shows a view of a loading-unloading station at a distribution center.

A loading bay area 2 (FIG. 1) is provided at a building with dock 4. Dock 4 is provided with an opening or door 6 and a so-called dock shelter 8 for protection thereof. Truck 10 is reversed to area 2, inter alia with rear wheels 12. Truck 10 moves here substantially parallel to blocking device 14 in driveway 16.

Blocking device 14 (FIGS. 2A-D) comprises a first guide track support 16 and a second guide track support 18 that is placed with an angle β to the lengthwise orientation of guide track 20. One end 22 of supports 16, 18 is connected to ground support plate 24. The other end 26 of supports 16, 18 is provided with pen or pin 28 that is connected to connection 30. Supports 16, 18 are rotatable relative to guide track 20 around axis 31. Connection 30 is provided with hinge 33 enabling some movement between guide track 20 and support 16, 18.

Carriage 32 is moveably provided in blocking device 14 with wheels 34 that are moveable along guide track 20. Carriage 32 is provided with blocking element or blocking rod 36 that is rotatable around shaft 38 and can be moved from a retracted position to an extended position. Carriage 32 is moved along guide track 20 with the use of spindle drive 40 and spindle nut 42. Blocking device 14 further comprises spindle end bearing 44 that in the illustrated embodiment is close to second support 18, and spindle bearing support 46 that in the illustrated embodiment is close to first support 16. Spindle 40 is activated with the use of hydraulic motor 48.

When blocking device 14 is moved from a low position close to ground 16 (FIGS. 2A low and 2B low) to a high position (FIGS. 2A high and 2B high) guide track 20 of blocking device 14 is moved over distance $D_1$ in a horizontal direction and simultaneous guide track 20 of blocking device 14 is moved over a distance $D_2$ in a vertical direction. In the illustrated embodiment the joint movement of distances $D_1$ and $D_2$ is defined by angle α (FIG. 2E) relative to the vertical. In fact, in the illustrated embodiment, $\tan(\alpha) = D_1/D_2$. In the illustrated embodiment the angle α is about 12.5°. It will be understood that, depending on the dimensions of blocking device 14 and characteristics of the location or driveway 16, angle α can be chosen differently. The vertical and horizontal movements over distances $D_2$ and $D_1$ respectively, can be performed simultaneously (schematically illustrated in FIG. 2E with a solid line) and successively (schematically illustrated in FIG. 2E with a dashed line). Both movements result in a diagonal repositioning of guide track 20. The lifting of guide track 20 is activated with cylinders 50. One end of cylinder 50 is connected via connection 52 to side plate or support plate 54. The other end of cylinder 50 is connected via connection 56 to guide track 20. In the illustrated embodiment guide track 20 is lowered when supports 16,18 move away from dock 4 with door 6. It will be understood that an alternative configuration could also be envisaged wherein guide track 20 is lifted when supports 16,18 move away from dock 4 with door 6.

Sliding spindle support 58 (FIG. 2C) comprises a tube like part 60 and end parts 62. In use spindle support 58 is moveably attached to guide 20.

End parts 62 (FIG. 2D) of spindle support 58 are provided with spindle support bore 64 and grooves 66 that in the illustrated embodiment slide over spindle 40 and edges 68 of guide track 20, respectively. End parts 62 are connected with a number of tie-rods that extend through carriage 32. In a presently preferred embodiment three tie-rods connect end parts 62. It will be understood that a different configuration to connect end parts 62 with a different number of rods and/or different elements such as arms, tubes etc. can also be envisaged in accordance with the present invention.

Figure 2A:
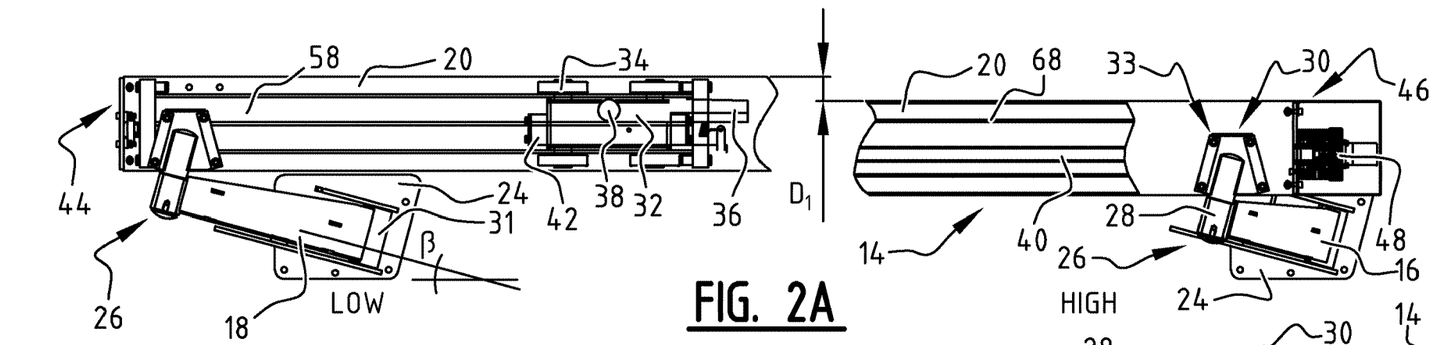
FIGS. 2A-E show a blocking device according to the invention in different positions.
Figures 2B, 2C, 2D:
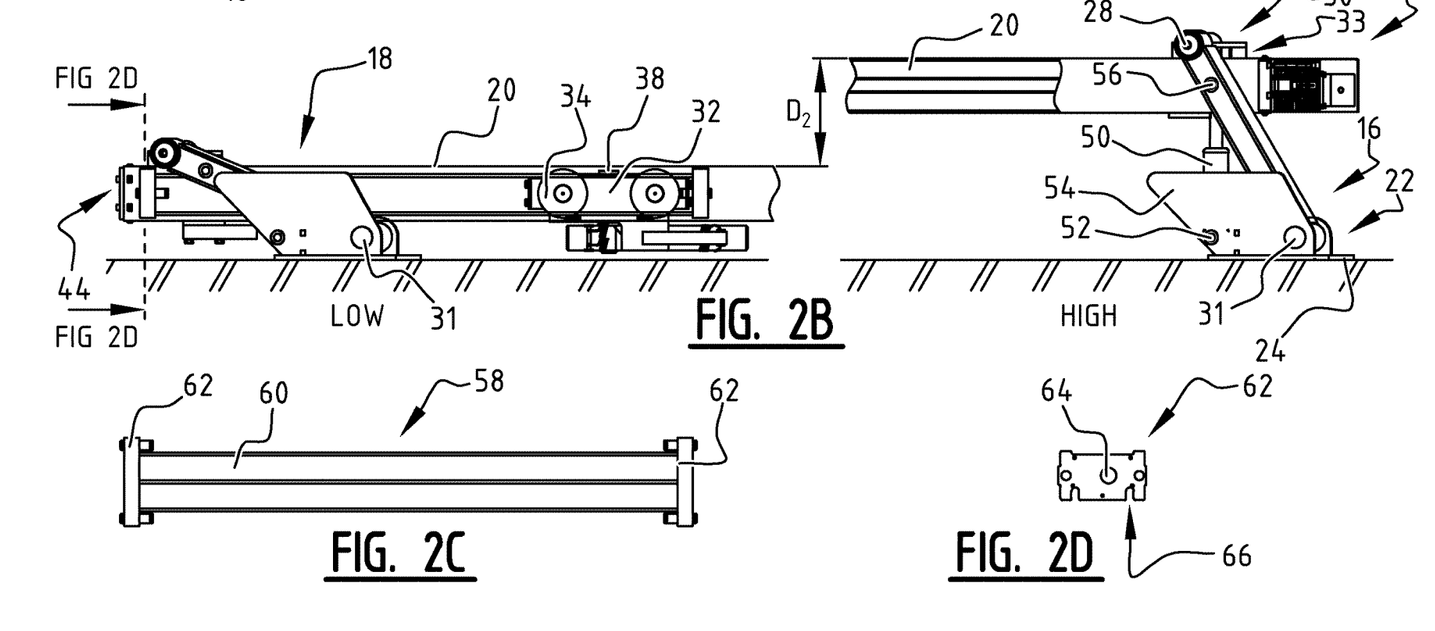
Figure 2E:
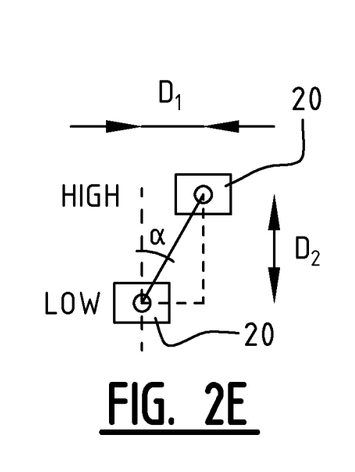

In use, a vehicle or object is parked in driveway 16 when blocking device 14 is in its low position (FIGS. 2A low and 2B low). After the vehicle or object is parked, blocking device 14 is activated. Carriage 32 moves along guide track 20 to its desired position. Optionally, vehicle tyre diameters are determined by contacting vehicle tyre 12 at different heights with blocking element 36 to determine the optimal engaging height. Preferably, blocking element 36 is rotated from its retracted position around shaft 38 to its extended position, where after guide track 20 is lifted to its high position (FIGS. 2A high and 2B high). Blocking element 36 prevents rolling away or removing the vehicle and/or removing the object in driveway 16, or gaining access to driveway 16. When a vehicle is authorized to leave driveway 16 or to enter driveway 16, blocking element 36 is retracted again. Preferably, before retracting blocking element 36 guide track 20 is brought to its lower position.

In the illustrated embodiment carriage 32 (directly or indirectly) contacts one of the end parts 62 and spindle support 58 with its two end parts 62 and connecting tie-rods or similar elements co-displaces with carriage 32. When carriage 32 is moved in the opposite direction it contacts the other end part 62 and moves support 58 in the opposite direction. In the illustrated embodiment the distance between spindle bearings 44, 46 is about 3 meters. Support 58 provides additional support and stability by reducing this distance to about 1.5 meters. It will be understood that other dimensions can also be envisaged in accordance with the invention.

Figure 3A:
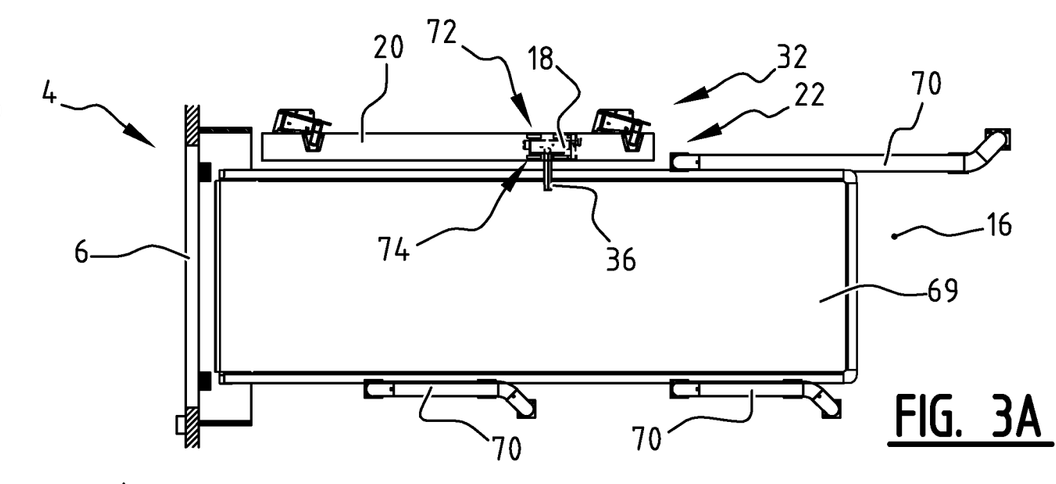
FIGS. 3A-C show the blocking device of FIG. 2 used to block an object and/or entry to the driveway.
Figure 3B:
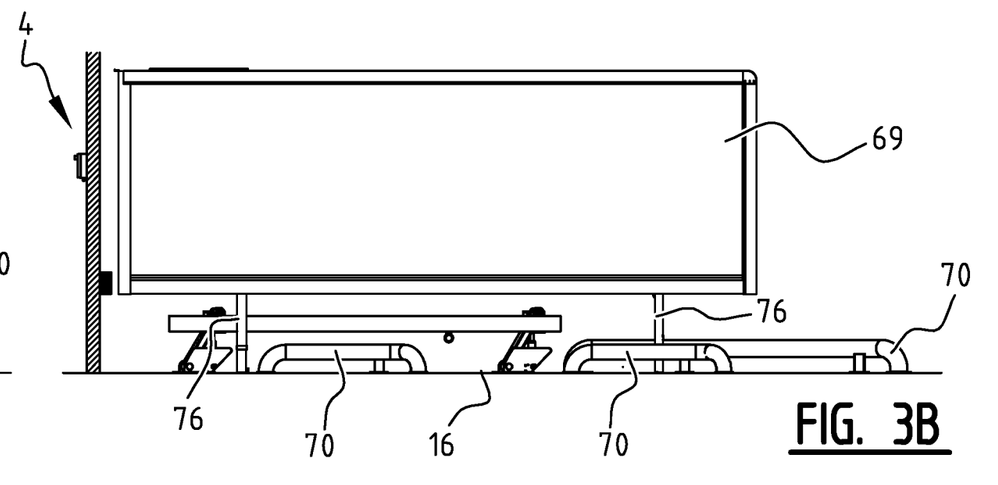
Figure 3C:
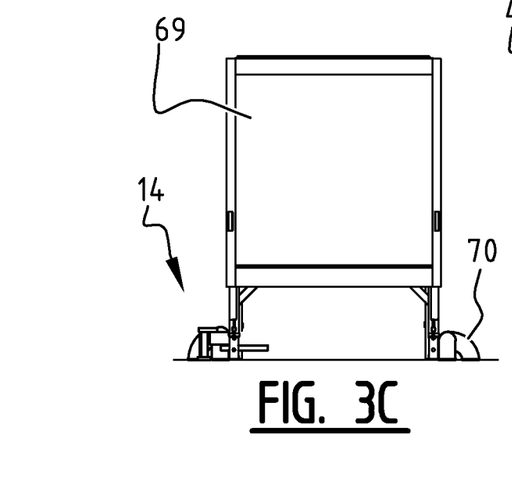

Swap body 69 (FIGS. 3A-C) is positioned at dock 4 of a distribution center having opening 6. In the illustrated embodiment swap body 69 is positioned in front of opening 6. Guiding elements 70 are positioned on one side of driveway 16. In the illustrated embodiment, on the other side blocking device 14 positioned with guide track 20, carriage 32 and housing 72. In the illustrated embodiment, locking mechanism 74 locks blocking device 36 on carriage 32 on guide track 20. For example, lock 74 can be embodied similar to the lock illustrated in EP 0684915 or EP 2371745 that are incorporated by reference herein. Alternatively, or in addition thereto, spindle 40 acts as lock 74, for example by switching off spindle motor 48. In the illustrated embodiment swap body 69 stands on legs 76 on ground 16. Blocking element 36 prevents a truck to move below swap body 69 and pick up swap body 69 unless authorized to do so.

Distribution center 102 (FIG. 4) comprises a number of docks or docking stations 104 that in the illustrated embodiment are provided with shelter 106, door 108, seals 110, barrier 112 and bumper 114. In the illustrated embodiment dock 104 further comprises dock leveler 116. Dock leveler 116 is provided with load cell 118 for measuring the loads that are loaded and/or unloaded, and position sensor 120 to measure the (angular) position of leveler 116. Door 108 is provided with one or more door position sensors 122 to detect the position of door 108. Barrier 112 is provided with status sensor 124.

In the illustrated embodiment and individual dock 104 of center 102 is provided with two blocking devices 126*a,b* that are only schematically shown for illustrative purposes. An example of blocking devices 126*a,b* is illustrated in detail in FIG. 2A-D. First blocking device 126*a* is provided at one side of driveway 16 and a second blocking device 126*b* is provided at the other side of driveway 16.

Figure 4:
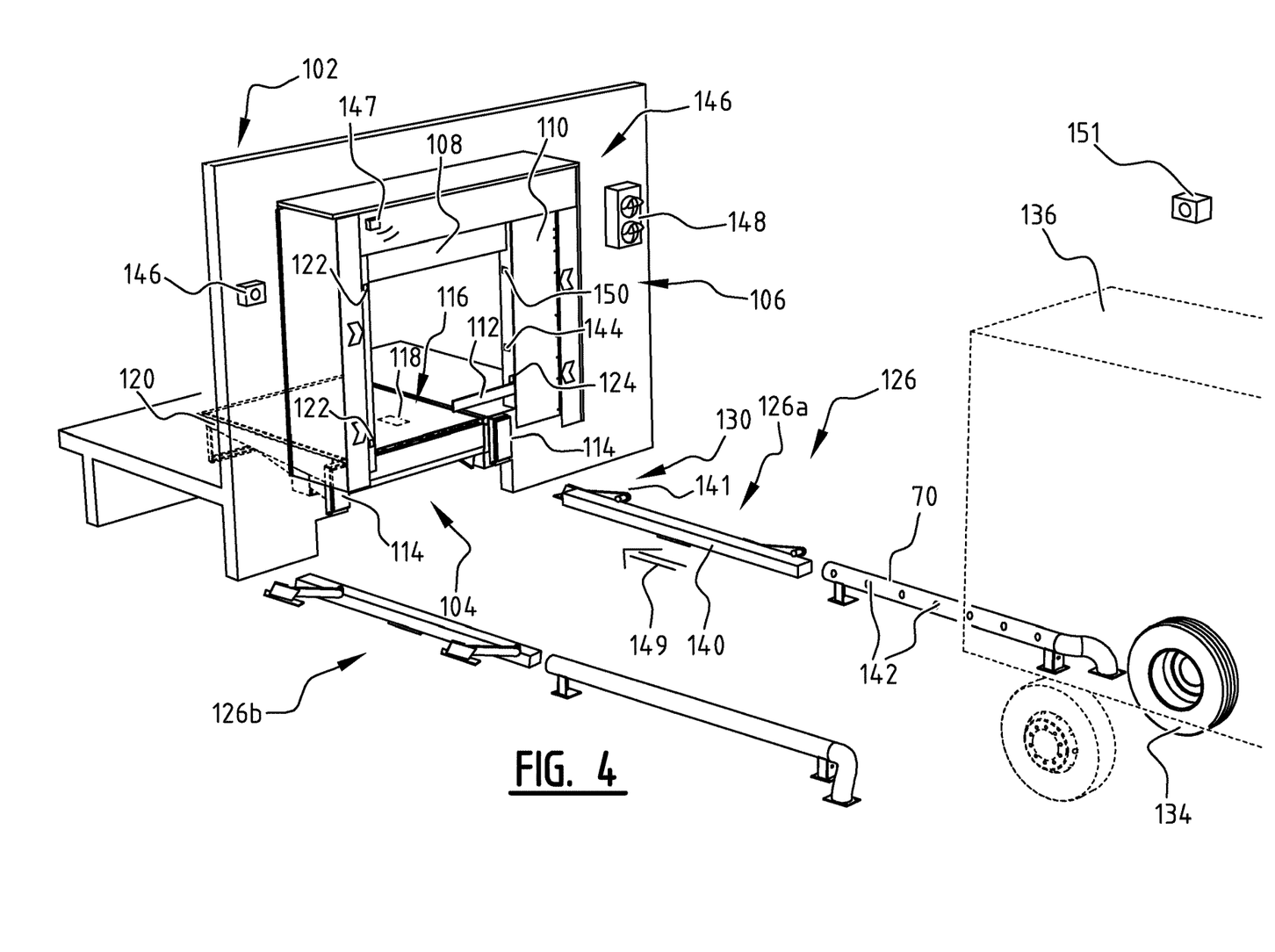
FIG. 4 shows a driveway of a dock provided with two blocking devices according to the invention.

In the illustrated embodiment blocking device 126 comprises locking system status sensor 141 and LED lights 142 of truck docking assistance system 144 to assist a driver of truck 136 when docking truck 136. Also in the illustrated embodiment, assistance system 144 further comprises camera 146 for detecting truck positions, signaling light 148 for further assisting the driver of truck 136, and projector 147 for projecting signals, such as arrows 149, on the ground surface assisting the truck driver. Camera 151 is preferably remotely controlled and used for identification and/or recognition of truck 136 when entering the premises of distribution center 102. After identifying truck 136 the driver is provided with a message or signals to direct truck 136 to the assigned dock 104 of center 102. This significantly improves the docking process.

Blocking device 126 receives an authorization signal from assistance system 144 to enable access to driveway or release wheel 134 of truck 136. This signal is given in reply to a request, for example received from the driver of truck 136, to enter or leave the driveway, provided such request can be authorized by assistance system 144, or alternatively by an operator and/or other external decision system. The authorization signal results in blocking device 126 removing blocking element 36.

In addition to its preferred use in assistance system 144 camera 146 monitors part of the surroundings of center 102 104 and/or monitors the inside dock area. Furthermore, camera 146 can be used to identify truck 136, in a presently preferred embodiment through number plate recognition. Alternatively, a separate camera system is provided for identification purposes.

Optionally, camera 146, 151 provides information about the type of vehicle, such as truck 136, to controller 150 enabling controller 150 to adjust the settings of dock components, such as leveler 116, cylinder 50 for adapting the height of blocking device 126 and/or use vehicle specific information for debiting the user of center 102 and/or dock 104 for the docking operation that is performed. Optionally, camera 146 detects the vehicle registration, for example by the license plates, optionally providing the relevant information to the accounting department such that the vehicle owner can be debited for the actual docking operation(s).

Furthermore, by monitoring the use of dock components, such as blocking device 126, the system is capable of providing information about how often and under what conditions the dock components are used. The user, for example the vehicle owner, can be debited on the actual use. Such option could be of interest also when dock equipment is rented or leased. In such case the system may communicate with an external network/system to enable monitoring and/or debiting the user or other party based on actual use by the equipment owner, for example.

The working of dock guard 126 will be illustrated with an example. Swap body 69 is required at opening 6 of dock 4. A truck enters driveway 16 with blocking device 126 enabling access to driveway 16 in an entrance blocking mode. The truck sets down swap body 69 and leaves driveway 16. Blocking device 126 then positions blocking element 36 such that swap body 69 can not be engaged by a truck. This prevents a truck of picking up swap body 69 as entrance to driveway 16 is blocked. As soon as swap body 69 can be moved, for example when goods have been loaded and/or unloaded and removal is authorized, the truck can pick up swap body 69. In that case, as soon as the truck is in the neighborhood of driveway 16 a request can be provided to one or more controllers 144, 150, for example, or an operator. If valid, such request can be authorized and the authorization signal can be provided to blocking device 126 such that blocking element 36 will be removed and entrance to driveway 16 is enabled such that swap body 69 can be picked up by the truck and can be removed from dock 4.

In an alternative vehicle blocking mode, blocking element 36 engages wheel 134 of the truck and blocks the truck from unauthorized leaving driveway 16. In a similar way, the truck may request permission to leave driveway 16 after which one or more controllers 144, 150 and/or an operator may grant such request and authorize blocking device 14, 126 to remove blocking element 36 such that the truck may leave driveway 16. With the use of one or more of controllers 144, 150 or another control system, blocking device 14, 126 can switch between its different modes.

It will be understood that individual features of the different embodiments or applications can be exchanged between or applied to other embodiments.

The present invention is by no means limited to the above described preferred embodiments thereof. The rights sought are defined by the following claims within the scope of which many modifications can be envisaged.

The invention claimed is:

1. A blocking device for blocking a vehicle and/or entrance to a loading-unloading station, comprising:
    a guide track with guide track supports disposed along a driveway;
    a carriage attached to the guide track with a blocking element, with the carriage being capable of moving along the driveway;
    a blocking element extension mechanism configured to extend the blocking element between a retracted position and an extended blocking position; and
    a guide track drive configured for lifting and/or lowering the guide track, wherein the guide track drive is further configured such that the guide track performs a horizontal movement when being lifted or lowered, and wherein the vertical and horizontal movements are being performed simultaneously or successively.

2. The blocking device according to claim 1, wherein a direction of movement of the guide track is at an angle to the vertical.

3. The blocking device according to claim 2, wherein the angle is in the range of 5–30° with the vertical.

4. The blocking device according to claim 1, wherein the guide track comprises an additional support extending over at least a part of the guide track in a lengthwise direction.

5. The blocking device according to claim 4, wherein the additional support is moveable along the guide track.

6. The blocking device according to claim 1, wherein the carriage is moveable with a carriage drive, wherein the carriage drive comprises a spindle.

7. The blocking device according to claim 1, wherein the guide track supports are put at an angle to a lengthwise direction of the guide track.

8. The blocking device according to claim 1, wherein the guide track comprises a support connection for hingedly connecting to one of the guide track supports.

9. The blocking device according to claim 8, wherein the support connection comprises a sliding connector enabling a sliding movement between the guide track support and the guide track.

10. The blocking device according to claim 1, wherein the guide track drive comprises a first lifting mechanism for lifting the guide track.

11. The blocking device according to claim 10, wherein the guide track drive further comprises a second lifting mechanism for lifting another part of the guide track, and a drive connection configured for connecting the first lifting mechanism with the second lifting mechanism.

12. The blocking device according to claim 1, further comprising:
    an anti-roll mode, wherein the blocking element engages a tire or other element at a first height; and
    a locking mode, wherein the blocking element engages the tire or other element at a second height above the first height.

13. The blocking device according to claim 2, wherein the guide track comprises an additional support extending over at least a part of the guide track in a lengthwise direction.

14. The blocking device according to claim 2, wherein the carriage is moveable with a carriage drive, wherein the carriage drive comprises a spindle.

15. The blocking device according to claim 2, wherein the guide track drive comprises a first lifting mechanism for lifting the guide track.

16. The blocking device according to claim 2, further comprising:
    an anti-roll mode, wherein the blocking element engages a tire or other element at a first height; and
    a locking mode, wherein the blocking element engages the tire or other element at a second height above the first height.

17. The blocking device according to claim 11, further comprising:
    an anti-roll mode, wherein the blocking element engages a tire or other element at a first height; and
    a locking mode, wherein the blocking element engages the tire or other element at a second height above the first height.

18. A dock of a loading-unloading station, comprising a blocking device for blocking a vehicle and/or entrance to a loading-unloading station, comprising:
    a guide track with guide track supports disposed along a driveway;

a carriage attached to the guide track with a blocking element, with the carriage being capable of moving along the driveway;

a blocking element extension mechanism configured to extend the blocking element between a retracted position and an extended blocking position; and a guide track drive configured for lifting and/or lowering the guide track, wherein the guide track drive is further configured such that the guide track performs a horizontal movement when being lifted or lowered, and wherein the vertical and horizontal movements are being performed simultaneously or successively.

19. The dock according to claim 18, further comprising a second blocking device on another side of the driveway.

20. A method for blocking a vehicle and/or guarding a driveway of a loading-unloading station, comprising the steps of:

providing a blocking device for blocking a vehicle and/or entrance to a loading-unloading station, comprising:

a guide track with guide track supports disposed along a driveway;

a carriage attached to the guide track with a blocking element, with the carriage being capable of moving along the driveway;

a blocking element extension mechanism configured to extend the blocking element between a retracted position and an extended blocking position; and a guide track drive configured for lifting and/or lowering the guide track, wherein the guide track drive is further configured such that the guide track performs a horizontal movement when being lifted or lowered, and wherein the vertical and horizontal movements are being performed simultaneously or successively; and blocking and/or releasing a vehicle and/or entry to the driveway.

* * * * *